United States Patent
Furman et al.

(10) Patent No.: US 9,767,369 B2
(45) Date of Patent: Sep. 19, 2017

(54) IMAGE AND VIDEO COMPRESSION FOR REMOTE VEHICLE ASSISTANCE

(71) Applicant: Waymo LLC, Mountain View, CA (US)

(72) Inventors: Vadim Furman, Los Gatos, CA (US); Andrew Hughes Chatham, San Francisco, CA (US); Abhijit Ogale, Mountain View, CA (US); Dmitri Dolgov, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/173,347

(22) Filed: Jun. 3, 2016

(65) Prior Publication Data

US 2016/0283804 A1   Sep. 29, 2016

Related U.S. Application Data

(63) Continuation of application No. 14/249,611, filed on Apr. 10, 2014, now Pat. No. 9,384,402.

(51) Int. Cl.

| | |
|---|---|
| *G06T 9/00* | (2006.01) |
| *G06K 9/00* | (2006.01) |
| *B60R 11/04* | (2006.01) |
| *G06K 9/62* | (2006.01) |
| *G01C 21/00* | (2006.01) |
| *H04N 19/117* | (2014.01) |
| *H04N 19/136* | (2014.01) |
| *H04N 19/17* | (2014.01) |

(Continued)

(52) U.S. Cl.
CPC .......... *G06K 9/00805* (2013.01); *B60R 11/04* (2013.01); *G01C 21/00* (2013.01); *G06K 9/6202* (2013.01); *G06T 9/00* (2013.01); *H04N 19/117* (2014.11); *H04N 19/136* (2014.11); *H04N 19/167* (2014.11); *H04N 19/17* (2014.11); *H04N 19/85* (2014.11); *B60R 2011/004* (2013.01); *B60R 2011/008* (2013.01); *B60R 2011/0026* (2013.01); *G06K 9/00791* (2013.01)

(58) Field of Classification Search
USPC .......................................................... 701/211
See application file for complete search history.

(56) References Cited

U.S. PATENT DOCUMENTS

| | | | |
|---|---|---|---|
| 5,495,576 A | 2/1996 | Ritchey | |
| 5,870,502 A * | 2/1999 | Bonneau | G06K 9/00221 |
| | | | 375/240.1 |

(Continued)

*Primary Examiner* — Shelley Chen
(74) *Attorney, Agent, or Firm* — McDonnell Boehnen Hulbert & Berghoff LLP

(57) ABSTRACT

A vehicle may receive one or more images of an environment of the vehicle. The vehicle may also receive a map of the environment. The vehicle may also match at least one feature in the one or more images with corresponding one or more features in the map. The vehicle may also identify a given area in the one or more images that corresponds to a a portion of the map that is within a threshold distance to the one or more features. The vehicle may also compress the one or more images to include a lower amount of details in areas of the one or more images other than the given area. The vehicle may also provide the compressed images to a remote system, and responsively receive operation instructions from the remote system.

20 Claims, 8 Drawing Sheets

(51) Int. Cl.
*H04N 19/167* (2014.01)
*H04N 19/85* (2014.01)
*B60R 11/00* (2006.01)

(56) References Cited

U.S. PATENT DOCUMENTS

| | | | | |
|---|---|---|---|---|
| 5,961,571 A | * | 10/1999 | Gorr | G01S 3/783 340/988 |
| 7,738,678 B2 | | 6/2010 | Breed et al. | |
| 8,340,902 B1 | | 12/2012 | Chiang | |
| 8,527,113 B2 | | 9/2013 | Yamauchi et al. | |
| 2004/0008183 A1 | * | 1/2004 | Morishita | G01C 21/367 345/156 |
| 2004/0165784 A1 | * | 8/2004 | Xie | G06K 9/3233 382/254 |
| 2005/0084136 A1 | * | 4/2005 | Xie | G06F 17/30905 382/107 |
| 2008/0263012 A1 | * | 10/2008 | Jones | G06F 17/30811 |
| 2009/0129672 A1 | * | 5/2009 | Camp, Jr. | H04N 19/17 382/173 |
| 2009/0265105 A1 | * | 10/2009 | Davis | G01C 21/20 701/300 |
| 2011/0026772 A1 | * | 2/2011 | Hagan | H04N 19/124 382/104 |
| 2011/0098918 A1 | * | 4/2011 | Siliski | G01C 21/265 701/533 |
| 2011/0221767 A1 | * | 9/2011 | Kostrzewski | G02B 5/09 345/629 |
| 2011/0267452 A1 | * | 11/2011 | Notsu | G06K 9/00798 348/116 |
| 2012/0099641 A1 | * | 4/2012 | Bekiares | H04N 19/196 375/240.02 |
| 2013/0156100 A1 | * | 6/2013 | Matsui | H04N 7/26132 375/240.07 |
| 2013/0278631 A1 | | 10/2013 | Border et al. | |
| 2015/0371431 A1 | * | 12/2015 | Korb | G06T 9/00 382/113 |

* cited by examiner

IMAGE AND VIDEO COMPRESSION FOR REMOTE VEHICLE ASSISTANCE

CROSS-REFERENCE TO RELATED APPLICATION

This application is a continuation of U.S. application Ser. No. 14/249,611, filed Apr. 10, 2014, the contents of which are entirely incorporated herein by reference as if fully set forth in this application.

BACKGROUND

Unless otherwise indicated herein, the materials described in this section are not prior art to the claims in this application and are not admitted to be prior art by inclusion in this section.

A vehicle could be any wheeled, powered vehicle and may include a car, truck, motorcycle, bus, etc. Vehicles can be utilized for various tasks such as transportation of people and goods, as well as many other uses.

Some vehicles may be partially or fully autonomous. For instance, when a vehicle is in an autonomous mode, some or all of the driving aspects of vehicle operation can be handled by a vehicle control system. In such cases, computing devices located on board and/or in a server network could be operable to carry out functions such as planning a driving route, sensing aspects of the vehicle, sensing the environment of the vehicle, and controlling drive components such as steering, throttle, and brake. Thus, autonomous vehicles may reduce or eliminate the need for human interaction in various aspects of vehicle operation.

SUMMARY

In one example, a method is provided that comprises a vehicle receiving one or more images of an environment of the vehicle. The method further comprises the vehicle receiving a map of the environment. The method further comprises matching at least one feature in the one or more images with corresponding one or more features in the map. The method further comprises identifying a given area in the one or more images that corresponds to a portion of the map that is within a threshold distance to the one or more features. The method further comprises the vehicle compressing the one or more images to include a lower amount of details in areas of the one or more images other than the given area. The method further comprises the vehicle providing the compressed images to a remote system. The method further comprises receiving operation instructions for the vehicle from the remote system responsive to providing the compressed images.

In another example, a vehicle is provided that includes a camera coupled to the vehicle and configured to capture one or more images of an environment of the vehicle. The vehicle also includes one or more processors and data storage configured to store instructions executable by the one or more processors. The instructions may cause the vehicle to obtain the one or more images of the environment from the camera. The instructions may further cause the vehicle to receive a map of the environment. The instructions may further cause the vehicle to match at least one feature in the one or more images with corresponding one or more features in the map. The instructions may further cause the vehicle to identify a given area in the one or more images that corresponds to a portion of the map that is within a threshold distance to the one or more features. The instructions may further cause the vehicle to compress the one or more images to include a lower amount of details in areas of the one or more images other than the given area. The instructions may further cause the vehicle to provide the compressed images to a remote system. The instructions may further cause the vehicle to receive operation instructions for the vehicle from the remote system responsive to providing the compressed images.

In yet another example, a non-transitory computer readable medium is provided. The non-transitory computer readable medium may have instructions stored therein that when executed by a device, cause the device to perform functions. The functions comprise receiving one or more images of an environment of the device. The functions further comprise receiving a map of the environment. The functions further comprise matching at least one feature in the one or more images with corresponding one or more features in the map. The functions further comprise identifying a given area in the one or more images that corresponds to a portion of the map that is within a threshold distance to the one or more features. The functions further comprise compressing the one or more images to include a lower amount of details in areas of the one or more images other than the given area. The functions further comprise providing the compressed images to a remote system. The functions further comprise receiving operation instructions for the device from the remote system responsive to providing the compressed images.

In still another example, a system is provided comprising a means for receiving one or more images of an environment of a vehicle. The system also comprises a means for receiving a map of the environment. The system also comprises a means for matching at least one feature in the one or more images with corresponding one or more features in the map. The system also comprises a means for identifying a given area in the one or more images that corresponds to a portion of the map that is within a threshold distance to the one or more features. The system also comprises a means for compressing the one or more images to include a lower amount of details in areas of the one or more images other than the given area. The system also comprises a means for providing the compressed images to a remote system. The system also comprises a means for receiving operation instructions for the vehicle from the remote system responsive to providing the compressed images.

These as well as other aspects, advantages, and alternatives, will become apparent to those of ordinary skill in the art by reading the following detailed description, with reference where appropriate to the accompanying figures.

DETAILED DESCRIPTION

Figure 1:
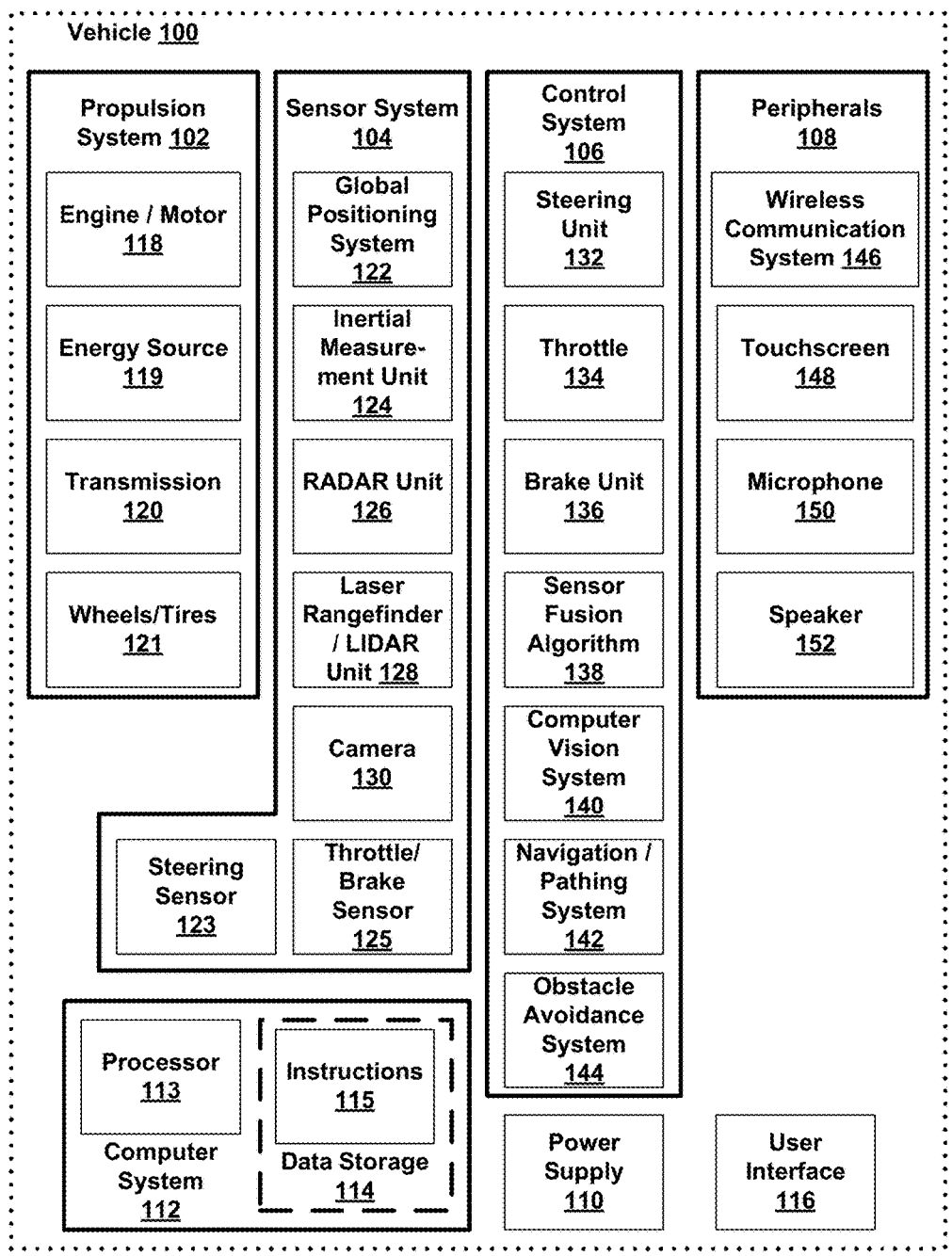
FIG. 1 is a functional block diagram illustrating a vehicle, according to an example embodiment.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

The present disclosure provides methods and apparatuses that improve operation of a partially or fully autonomous vehicle by receiving operation instructions from a remote system that includes human operators or computer operators. Specifically, the vehicle may provide sensor data, such as images or video streams of an environment of the vehicle, to the remote system. In turn, the remote system may aid the vehicle in detecting or classifying objects and driving situations in the environment of the vehicle. For example, the remote system may provide operation instructions for a control system that operates the vehicle based on the sensor data from the vehicle. Thus, for example, the vehicle may benefit from decision-making ability of a human operator or a more powerful computing system to overcome challenging driving scenarios.

An example of an unusual driving scenario is as follows. A gardening crew may be parked on a side of a narrow two-lane road, blocking one of the two lanes. The gardening crew may not be part of a normal classification that the vehicle may perform during typical operation. Further, crew members may be trying to direct traffic around the gardening crew's vehicle (so that oncoming traffic and outgoing traffic share the one open lane). The crewmember may be holding out his or her hand to signal one side of traffic to stop. The vehicle in this scenario may detect the outstretched arm but may not know whether that indicates someone walking in the road or directing traffic. In such a case, the vehicle may detect that this is likely an unusual event and send a camera image (or other sensor data) to the remote system that could analyze the situation and provide operation instructions for the vehicle. For example, the remote system may instruct the vehicle to stop and wait for the vehicle's turn to use the one lane. Thus, in this scenario, the overall system may ensure safe operation of the vehicle.

In an example arrangement, communicating the sensor data reliably from the vehicle to the remote system may be prohibited by bandwidth limitations or other data connection limitations. Additionally, in some examples, the remote system may only need a portion of the sensor data that is relevant to an immediate vicinity of the vehicle or the road traveled by the vehicle.

Within examples, methods and devices are provided for compressing sensor data pertaining to an environment of a vehicle prior to transmitting the sensor data for processing by a remote system. In one example, the vehicle may receive an image of the environment from a camera coupled to the vehicle. Additionally, in the example, the vehicle may obtain a map of the environment, such as a detailed map of the road. The detailed map may, for example, include synthetic intensity and imagery tiles and/or a symbolic representation of a road network called a "roadgraph." The map, for example, may include an indication of various features in the road, such as locations and dimensions of street lanes, street signs, or other identifying features of the road. In turn, the vehicle may match features in the image with corresponding features in the map. Further, in the example, the vehicle may identify a given area in the image that corresponds to a portion of the map within a threshold distance to the matched features. In the example, the threshold distance may include areas of interest to the driving situation of the vehicle, such as the road that the vehicle is traveling on and an immediate vicinity of the road. Further, in the example, the vehicle may compress the image to include a lower amount of details in areas other than the given area. The compressed image, for example, may have a smaller size than a corresponding compressed image of the unaltered received image. The vehicle may then provide the compressed image to a remote system for further processing. In response, for example, the remote system may provide operation instructions for the vehicle.

In some embodiments, the functions described herein may be based on sensor data other than optical cameras. For example, the sensor data may be from various sensors such as radar, laser, or audio sensors. In one example, a radar sensor may provide radar data indicating objects in the environment of the vehicle, and the disclosed system may remove a portion of the radar data that corresponds with areas other than the given area. In another example, a microphone may capture sounds in the environment, and the disclosed system may remove a portion of the sounds that originated from areas other than the given area. Thus, in some examples, compression of the sensor data as described herein prior to transmission for processing by the remote system may require lower bandwidth than a transmission that includes the sensor data with an equal level of details in all areas of the environment.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

FIG. 1 is a functional block diagram illustrating a vehicle 100, according to an example embodiment. The vehicle 100 could be configured to operate fully or partially in an autonomous mode. While in autonomous mode, the vehicle 100 may be configured to operate without human interaction. For example, a computer system could control the vehicle 100 while in the autonomous mode. As part of operating in the autonomous mode, the vehicle may identify features of the environment around the vehicle. If one or more of the identified features has an associated confidence below a confidence threshold, or the computer system needs assistance in making a driving decision, the computer system may transmit data related to the feature or the environment for further processing by a remote system. The computer system may then receive instructions from either a remote computer or a human operator. In response, the computer system may alter the control of the autonomous vehicle.

The vehicle 100 could include various subsystems such as a propulsion system 102, a sensor system 104, a control system 106, one or more peripherals 108, as well as a power supply 110, a computer system 112, a data storage 114, and a user interface 116. The vehicle 100 may include more or fewer subsystems and each subsystem could include multiple elements. Further, each of the subsystems and elements of vehicle 100 could be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion for the vehicle 100. Depending upon the embodiment, the propulsion system 102 could include an engine/motor 118, an energy source 119, a transmission 120, and wheels/tires 121. The engine/motor 118 could be any combination of an internal combustion engine, an electric motor, steam engine, Stirling engine. Other motors and/or engines are possible. In some embodiments, the engine/motor 118 may be configured to convert energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. Examples of energy sources 119 contemplated within the scope of the present disclosure include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 118 could also provide energy for other systems of the vehicle 100.

The transmission 120 could include elements that are operable to transmit mechanical power from the engine/motor 118 to the wheels/tires 121. The transmission 120 could include a gearbox, a clutch, a differential, and a drive shaft. Other components of transmission 120 are possible. The drive shafts could include one or more axles that could be coupled to the one or more wheels/tires 121.

The wheels/tires 121 of vehicle 100 could be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 could represent at least one wheel that is fixedly attached to the transmission 120 and at least one tire coupled to a rim of the wheel that could make contact with the driving surface. The wheels/tires 121 could include any combination of metal and rubber. Other materials are possible.

The sensor system 104 may include several elements such as a Global Positioning System (GPS) 122, an inertial measurement unit (IMU) 124, a radar 126, a laser rangefinder/LIDAR 128, a camera 130, a steering sensor 123, and a throttle/brake sensor 125. The sensor system 104 could also include other sensors, such as those that may monitor internal systems of the vehicle 100 (e.g., oxygen monitor, fuel gauge, engine oil temperature, brake wear, etc.).

The GPS 122 could include a transceiver operable to provide information regarding the position of the vehicle 100 with respect to the Earth. The IMU 124 could include a combination of accelerometers and gyroscopes and could represent any number of systems that sense position and orientation changes of a body based on inertial acceleration. Additionally, the IMU 124 may be able to detect a pitch and yaw of the vehicle 100. The pitch and yaw may be detected while the vehicle is stationary or in motion.

The radar 126 may represent a system that utilizes radio signals to sense objects, and in some cases their speed and heading, within the local environment of the vehicle 100. Additionally, the radar 126 may have a plurality of antennas configured to transmit and receive radio signals. The laser rangefinder/LIDAR 128 could include one or more laser sources, a laser scanner, and one or more detectors, among other system components. The laser rangefinder/LIDAR 128 could be configured to operate in a coherent mode (e.g., using heterodyne detection) or in an incoherent detection mode. The camera 130 could include one or more devices configured to capture a plurality of images of the environment of the vehicle 100. The camera 130 could be a still camera or a video camera.

The steering sensor 123 may represent a system that senses the steering angle of the vehicle 100. In some embodiments, the steering sensor 123 may measure the angle of the steering wheel itself. In other embodiments, the steering sensor 123 may measure an electrical signal representative of the angle of the steering wheel. Still, in further embodiments, the steering sensor 123 may measure an angle of the wheels of the vehicle 100. For instance, an angle of the wheels with respect to a forward axis of the vehicle 100 could be sensed. Additionally, in yet further embodiments, the steering sensor 123 may measure a combination (or a subset) of the angle of the steering wheel, electrical signal representing the angle of the steering wheel, and the angle of the wheels of vehicle 100.

The throttle/brake sensor 125 may represent a system that senses the position of either the throttle position or brake position of the vehicle 100. In some embodiments, separate sensors may measure the throttle position and brake position. In some embodiments, the throttle/brake sensor 125 may measure the angle of both the gas pedal (throttle) and brake pedal. In other embodiments, the throttle/brake sensor 125 may measure an electrical signal that could represent, for instance, an angle of a gas pedal (throttle) and/or an angle of a brake pedal. Still, in further embodiments, the throttle/brake sensor 125 may measure an angle of a throttle body of the vehicle 100. The throttle body may include part of the physical mechanism that provides modulation of the energy source 119 to the engine/motor 118 (e.g., a butterfly valve or carburetor). Additionally, the throttle/brake sensor 125 may measure a pressure of one or more brake pads on a rotor of vehicle 100. In yet further embodiments, the throttle/brake sensor 125 may measure a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, the throttle/brake sensor 125 could be configured to measure a pressure applied to a pedal of the vehicle, such as a throttle or brake pedal.

The control system 106 could include various elements include steering unit 132, throttle 134, brake unit 136, a sensor fusion algorithm 138, a computer vision system 140, a navigation/pathing system 142, and an obstacle avoidance system 144. The steering unit 132 could represent any combination of mechanisms that may be operable to adjust the heading of vehicle 100. The throttle 134 could control, for instance, the operating speed of the engine/motor 118 and thus control the speed of the vehicle 100. The brake unit 136 could be operable to decelerate the vehicle 100. The brake unit 136 could use friction to slow the wheels/tires 121. In other embodiments, the brake unit 136 could convert the kinetic energy of the wheels/tires 121 to electric current.

A sensor fusion algorithm 138 could include, for instance, a Kalman filter, Bayesian network, or other algorithm that may accept data from sensor system 104 as input. The sensor fusion algorithm 138 could provide various assessments based on the sensor data. Depending upon the embodiment, the assessments could include evaluations of individual objects and/or features, evaluation of a particular situation, and/or evaluate possible impacts based on the particular situation. Other assessments are possible.

The computer vision system 140 could include hardware and software operable to process and analyze images in an effort to determine objects, important environmental features (e.g., stop lights, road way boundaries, etc.), and obstacles. The computer vision system 140 could use object recognition, Structure From Motion (SFM), video tracking, and other algorithms used in computer vision, for instance, to recognize objects, map an environment, track objects, estimate the speed of objects, etc.

The navigation/pathing system 142 could be configured to determine a driving path for the vehicle 100. The navigation/pathing system 142 may additionally update the driving path dynamically while the vehicle 100 is in operation. In some embodiments, the navigation/pathing system 142 could incorporate data from the sensor fusion algorithm 138, the GPS 122, and known maps so as to determine the driving path for vehicle 100.

The obstacle avoidance system 144 could represent a control system configured to evaluate potential obstacles based on sensor data and control the vehicle 100 to avoid or otherwise negotiate the potential obstacles.

Various peripherals 108 could be included in vehicle 100. For example, peripherals 108 could include a wireless communication system 146, a touchscreen 148, a microphone 150, and/or a speaker 152. The peripherals 108 could provide, for instance, means for a user of the vehicle 100 to interact with the user interface 116. For example, the touchscreen 148 could provide information to a user of vehicle 100. The user interface 116 could also be operable to accept input from the user via the touchscreen 148. In other instances, the peripherals 108 may provide means for the vehicle 100 to communicate with devices within its environment.

In one example, the wireless communication system 146 could be configured to wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 could communicate with a wireless local area network (WLAN), for example, using WiFi. In some embodiments, wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

The power supply 110 may provide power to various components of vehicle 100 and could represent, for example, a rechargeable lithium-ion or lead-acid battery. In an example embodiment, one or more banks of such batteries could be configured to provide electrical power. Other power supply materials and types are possible. Depending upon the embodiment, the power supply 110, and energy source 119 could be integrated into a single energy source, such as in some all-electric cars.

Many or all of the functions of vehicle 100 could be controlled by computer system 112. Computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during the operation of the vehicle 100 in the autonomous, semi-autonomous, and/or manual modes.

The vehicle 100 may include a user interface 116 for providing information to or receiving input from a user of vehicle 100. The user interface 116 could control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 may control the function of the vehicle 100 based on inputs received from various subsystems (e.g., propulsion system 102, sensor system 104, and control system 106), as well as from the user interface 116. For example, the computer system 112 may utilize input from the sensor system 104 in order to estimate the output produced by the propulsion system 102 and the control system 106. Depending upon the embodiment, the computer system 112 could be operable to monitor many aspects of the vehicle 100 and its subsystems. In some embodiments, the computer system 112 may disable some or all functions of the vehicle 100 based on signals received from sensor system 104.

The components of vehicle 100 could be configured to work in an interconnected fashion with other components within or outside their respective systems. For instance, in an example embodiment, the camera 130 could capture a plurality of images that could represent information about a state of an environment of the vehicle 100 operating in an autonomous mode. The state of the environment could include parameters of the road on which the vehicle is operating. For example, the computer vision system 140 may be able to recognize the slope (grade) or other features based on the plurality of images of a roadway. Additionally, the combination of Global Positioning System 122 and the features recognized by the computer vision system 140 may be used with map data stored in the data storage 114 to determine specific road parameters. Further, the radar unit 126 may also provide information about the surroundings of the vehicle.

In other words, a combination of various sensors (which could be termed input-indication and output-indication sensors) and the computer system 112 could interact to provide an indication of an input provided to control a vehicle or an indication of the surroundings of a vehicle.

In some embodiments, the computer system 112 may make a determination about various objects based on data that is provided by systems other than the radio system. For example, the vehicle may have lasers or other optical sensors configured to sense objects in a field of view of the vehicle. The computer system 112 may use the outputs from the various sensors to determine information about objects in a field of view of the vehicle. The computer system 112 may determine distance and direction information to the various objects. The computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 could be communicatively coupled together in a wired and/or wireless fashion.

Figure 2:
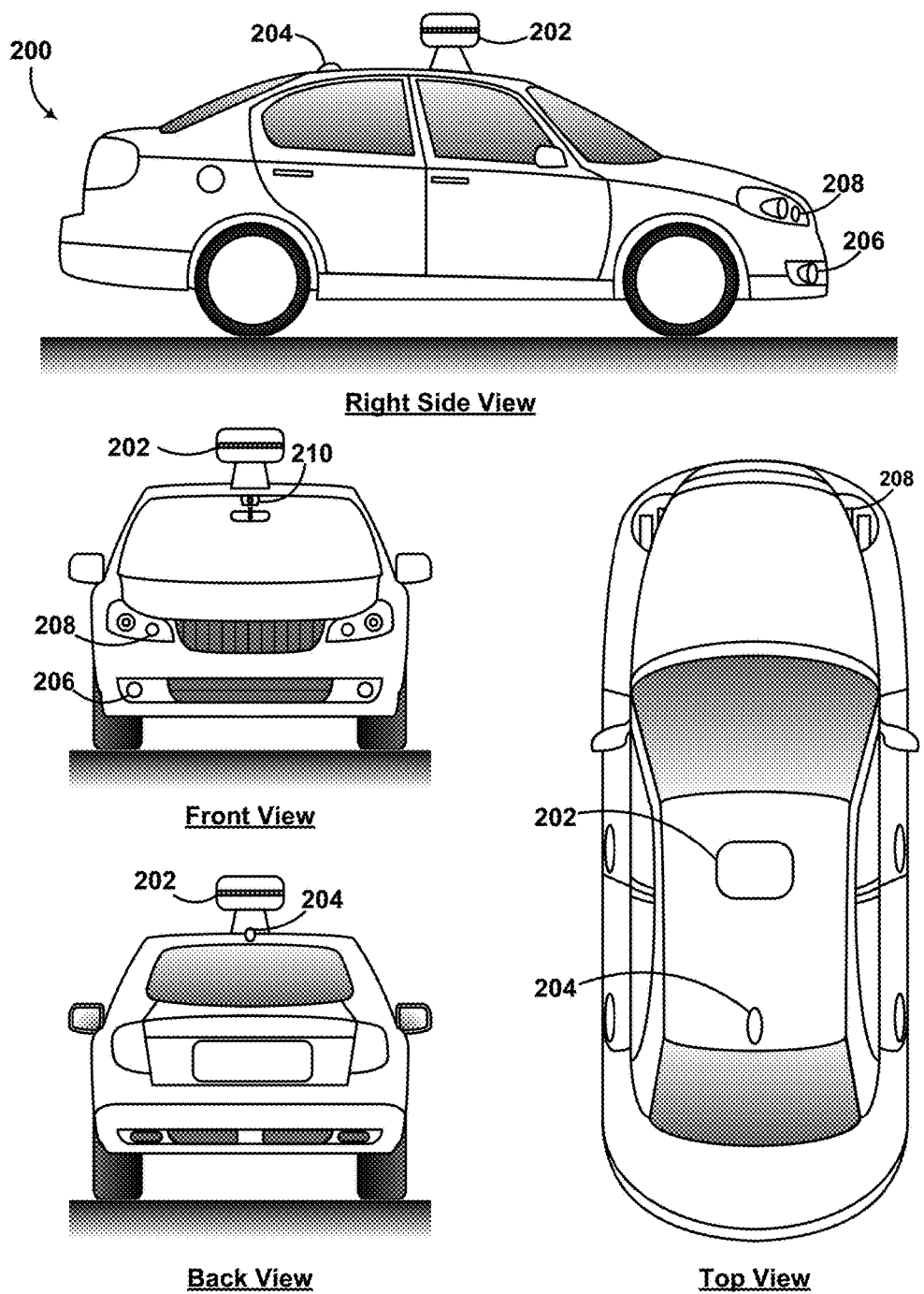
FIG. 2 illustrates a vehicle, according to an example embodiment.

FIG. 2 shows a vehicle 200 that could be similar or identical to vehicle 100 described in reference to FIG. 1. Depending on the embodiment, vehicle 200 could include a sensor unit 202, a wireless communication system 204, a radio unit 206, a laser rangefinder 208, and a camera 210. The elements of vehicle 200 could include some or all of the elements described for FIG. 1. Although vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

The sensor unit 202 could include one or more different sensors configured to capture information about an environment of the vehicle 200. For example, sensor unit 202 could include any combination of cameras, radars, LIDARs, range finders, radio devices (e.g., Bluetooth and/or 802.11), and acoustic sensors. Other types of sensors are possible. Depending on the embodiment, the sensor unit 202 could include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include radio unit 206 and laser range finder 208.

The wireless communication system 204 could be located as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 could be mounted inside a front windshield of the vehicle 200. The camera 210 could be configured to capture a plurality of images of the environment of the vehicle 200. Specifically, as illustrated, the camera 210 could capture images from a forward-looking view with respect to the vehicle 200. Other mounting locations and viewing angles of camera 210 are possible. The camera 210 could represent one or more visible light cameras. Alternatively or additionally, camera 210 could include infrared sensing capabilities. The camera 210 could have associated optics that could be operable to provide an adjustable field of view. Further, the camera 210 could be mounted to vehicle 200 with a movable mount that could be operable to vary a pointing angle of the camera 210.

Figure 3:
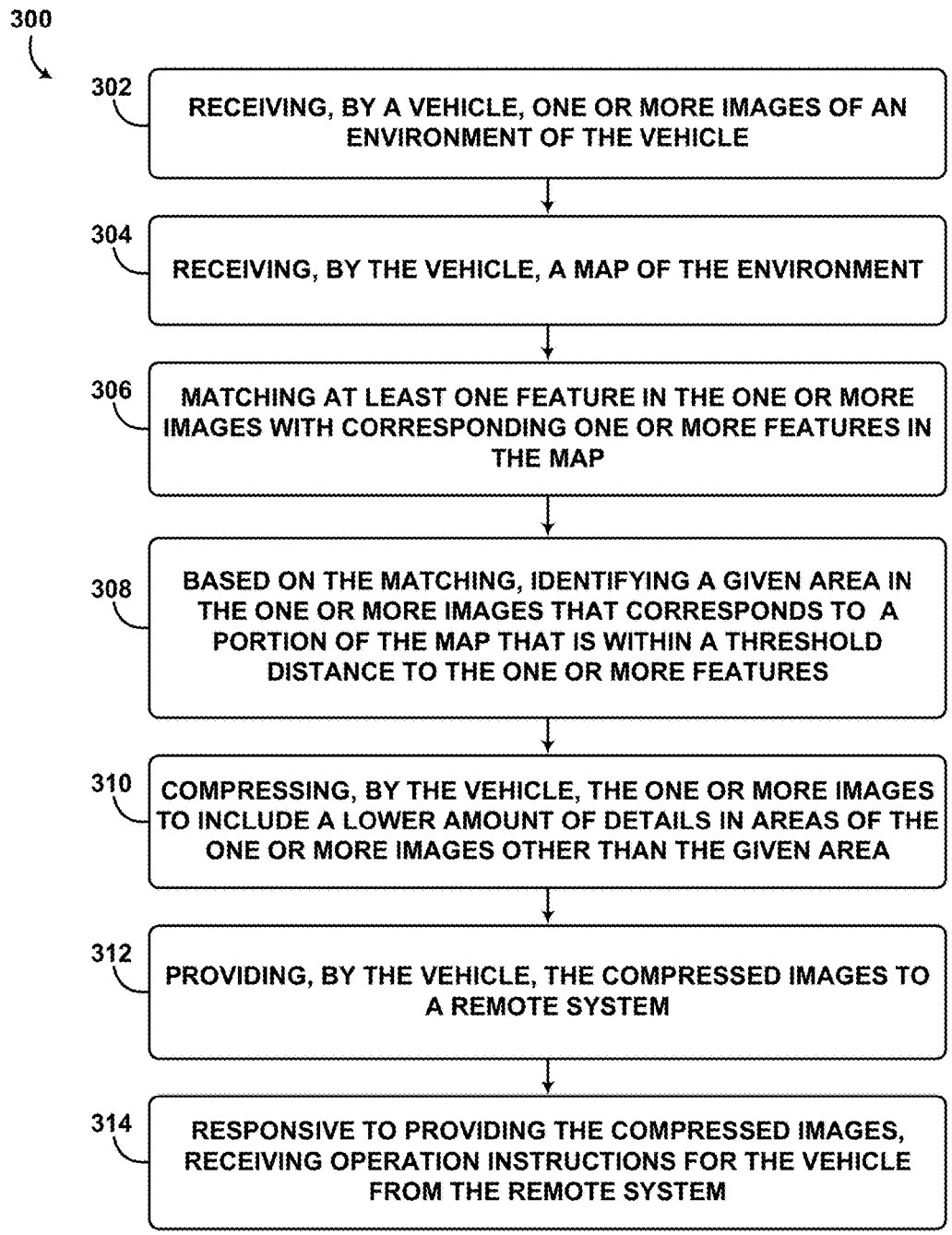
FIG. 3 illustrates a method, according to an example embodiment.

FIG. 3 illustrates a method 300, according to an example embodiment. Method 300 shown in FIG. 3 presents an embodiment of a method that could be used with the vehicles 100-200, for example. Method 300 may include one or more operations, functions, or actions as illustrated by one or more of blocks 302-314. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes a vehicle receiving one or more images of an environment of the vehicle. For example, a camera may be configured to capture still images and/or a video stream of the environment. In various embodiments, the vehicle may have more than one camera positioned in different orientations. Additionally, in some examples, the camera may be able to move to capture images and/or video in different directions. The camera may be configured to store captured images and/or video to a memory for later processing by a processing system of the vehicle. Further, in some examples, the captured one or more images may indicate a point of view of a driver of the vehicle.

Additionally or alternatively, in some embodiments of the method 300, the vehicle may receive other sensor data indicating the environment. For example, the vehicle may have various sensors, including the camera, a radar unit, a laser range finder, a microphone, a radio unit, and/or other sensors. Each of these sensors may communicate data indicative of the environment to a processor in the vehicle.

In one example, a radar unit may be configured to transmit an electromagnetic signal that will be reflected by various objects near the vehicle. The radar unit may then capture the reflected electromagnetic signals, and make various determinations about objects that reflected the electromagnetic signal. For example, the distance and position to various reflected objects may be determined. The data from the radar unit may be used to augment and/or replace the one or more images captured by the camera as an indication of the environment. For example, a computer system included in the vehicle may process the data from the radar unit to generate the one or more images. Similarly, in another example, a laser range finder (e.g., LIDAR) may be utilized to obtain information about the environment, such as velocity and position of various objects in the environment, and the computer system may process the data to generate the one or more images or augment the one or more images from the camera.

In yet another example, a microphone may be configured to capture audio of the environment surrounding the vehicle. Sounds captured by the microphone may include emergency vehicle sirens and/or the sounds of other vehicles. A processing system may be able to identify the captured sounds and augment the one or more images captured by the camera.

Thus, some embodiments may include combining data from various sensors such as a camera to receive one or more images indicating the environment of the vehicle.

At block 304, the method 300 includes the vehicle receiving a map indicative of one or more features in the environment. For example, the vehicle may access a detailed map of the environment and/or a 3D model database that models the environment of the vehicle. For example, the detailed map may include a street-view representation of a road where the vehicle is driving that includes various objects such as road signs, street lines, road separators, etc. In one example, the detailed map may be implemented as a portion of a roadgraph that includes data such as intensity and/or elevation maps that describe the various objects in the road. Such detailed map, for example, may be generated by a computing system based on high resolution data collected over a period of time, and may be stored in a data storage of the vehicle to facilitate the rendering of the map at block 304. In another example, the map may be a portion of a 3D representation of the environment rendered based on a 3D model database that models the environment of the vehicle. In some examples, the detailed map may be generated based on satellite images or bird-view images of the road. The detailed map and/or the database may be included in data storage accessible by a computer system of the vehicle, or may be in a remote server accessible via a network.

In one example, the vehicle may wirelessly communicate with a remote server and provide a position of the vehicle from various sensors included in the vehicle such as a Global Positioning System (GPS) sensor. In response, the remote server may provide the map of the environment, such as a portion of a detailed map (e.g., roadgraph) of the environment around the vehicle at the identified position. In another example, the vehicle may obtain the map from a roadgraph stored in a memory that is included in the vehicle, and may identify the map based on the GPS sensor output.

In some examples, the map may include information about the environment or the various objects in the environment. For example, the map may include dimension information such as a size of various road signs, or a width of the road that the vehicle is travelling on. Additionally, in some examples, the map may include other information that identifies the objects in the environment of the vehicle, such as lighting conditions or time of day. For example, the map may include shadows from the various objects or other relevant information that pertains to the lighting conditions.

At block 306, the method 300 includes matching at least one feature in the one or more images with corresponding one or more features in the map. For example, various image processing techniques such as edge matching or feature tracking may be employed to match the features in the images or video with corresponding features in the map. In one example, the one or more features may include various features that pertain to the driving environment, such as street lines or road signs.

Additionally, in some examples, the vehicle may utilize other information for the matching process. For example, the vehicle may utilize the pointing angle of the camera that captured the one or more images and/or the position of the vehicle to identify the corresponding view of the environment in the map. Other sensor data may also be utilized to confirm or enhance the mapping of the features.

At block 308, the method 300 includes identifying a given area in the one or more images that corresponds to a a portion of the map that is within a threshold distance to the one or more features based on the matching.

Based on various configuration options of the camera that obtained the images, for example, some areas of the one or more images may include details that are not relevant to the driving conditions of the vehicle. For example, objects in the sky such as birds or airplanes may not be relevant to the driving conditions but indicated in the one or more images. Thus, in some examples, the given area of the one or more images may include the road that the vehicle is driving on and an immediate vicinity of the road that is relevant to the driving conditions of the vehicle. For example, the portion of the map may include 1 meter from the sides of the road and 2 meters above the road. Such portion of the map, for example, may include areas of interest that are relevant to the current driving situation of the vehicle. Other example threshold distances are possible. In this example, the vehicle may identify the given area in the one or more images that corresponds to the portion of the map based on the matching (e.g., calibration) between the one or more images and the map at block 306.

In some examples, the threshold distance may be selected based on information in the map. In one example, lighting conditions in the one or more images may be identified by comparing shadows in the one or more images with shadows in simulated lighting conditions of the map. Thus, in this example, the threshold distance may be selected to be larger during night time than during day time. In another example, the map may indicate that the vehicle is approaching a street cross-section, and the vehicle may then increase the threshold distance to include details in the cross-section street.

In other examples, the threshold distance may be selected based on instructions received from a remote assistance operator (e.g., human operator, remote computer system, etc.), or from a passenger of the vehicle. For example, the operator may select the various threshold distances that the operator needs to analyze the driving situation of the vehicle, and provide operation instructions for the vehicle. Additionally, in some examples, the operator may select the camera that provides the one or more images and/or the video stream of the environment. Other methods are possible for the threshold distance selection, such as configuration data stored in the vehicle.

In some examples, based on matching the features in the one or more images with the corresponding features in the map, the vehicle may utilize details in the environment that are included in the map (e.g., dimensions, locations, etc.) to define an area of interest (e.g., the portion of the map) that is relevant to the driving conditions of the vehicle. Thus, for example, the remote assistance operator may only need the details in the given area of the one or more images to assist the vehicle in making an appropriate driving decision. In this example, the vehicle may associate the given area in the one or more images with the corresponding portion of the map (e.g., area of interest).

Accordingly, at block 310, the method 300 includes the vehicle compressing the one or more images to include a lower amount of details in areas of the one or more images other than the given area. For example, the given area may include more details, such as a higher resolution, than the other areas of the one or more images that are not relevant to the driving situation of the vehicle. Various example processes may be performed by the method 300 to compress the one or more images as described are presented below.

In one example, the vehicle may alter the received one or more images by replacing areas of the one or more images other than the given area with a given color. In turn, the altered images may then be compressed. For example, the other areas may be replaced by a uniform color (e.g., black, grey, etc.) before applying a compression function (e.g., JPEG, VP8, etc.) to compress the one or more images. In this example, the compression function may achieve a higher compression rate on the areas with the uniform colors, thereby generating compressed images that have a smaller size than corresponding compressed images that do not replace the other areas with the uniform color.

In another example, the vehicle may blur the areas of the one or more images other than the given area prior to compressing the one or more images. For example, the other areas may be blurred by an image processing technique such as Gaussian smoothing to remove high-frequency components of the other areas in the one or more images. Further, in the example, a compression function may then be applied to the blurred images to compress the one or more images. Again, in this example, the compression function may achieve a higher compression rate on the blurred images than on an unaltered version of the one or more images.

In yet another example, the vehicle may compress an unaltered version of the received one or more images to generate one or more intermediate images. The vehicle may then reduce an amount of details in areas of the intermediate images that correspond to areas of the received one or more images other than the given area. In turn, one or more final images having the reduced amount of details may be provided as the compressed images. For example, the intermediate images may be decoded (e.g., Huffman decoding) and then the areas other than the given area in the decoded images may then be degraded by removing high-frequency DCT coefficients in the decoded images to provide the final images. Again, in this example, the final images may have a smaller size than the intermediate compressed images.

In the examples described above, other compression techniques are possible with the altered, blurred, and/or the unaltered images. For example, lossless compression techniques such as run-length encoding, area image compression, differential pulse-code modulation (DPCM), entropy encoding, deflation, chain codes, etc. may be utilized. Additionally or alternatively, lossy compression techniques such as chroma subsampling, transform coding, fractal compression, etc. may also be utilized.

With the selective compression at block 310, the resulting compressed images can have a smaller size than compressing unaltered images. The smaller size may be advantageous in some embodiments. For example, where the compressed images are transmitted over a wireless or wired communication medium, bandwidth limitations and other data connection limitations may prohibit sending larger files reliably. For example, if the images or video stream are transmitted to a remote operator for further processing to assist the vehicle in making driving decisions, compressing the images as described may allow for reliably transmitting the compressed images to the remote operator, while maintaining a larger amount of details in areas of interest (e.g., the given area) than other irrelevant areas of the compressed images.

At block 312, the method 300 includes the vehicle providing the compressed images to a remote system. Because detecting objects and events in the environment of the vehicle can be important to the operation of the vehicle, in some examples, the vehicle may provide the compressed images to the remote system for further processing to assist the vehicle in making a correct driving decision. In one example, the remote system may include a human operator that reviews the compressed images. In turn, the human operator may detect an event that the vehicle is unable to determine, such as a person directing traffic. Thus, in this example, the human operator may send instructions to the vehicle to follow the traffic directions.

In another example, the vehicle may be unable to identify or classify a detected object in the environment. For example, a dog may be attempting to cross the road that the vehicle is travelling on. In this example, the computer system may be unable to determine that the detected object is a dog. However, for example, the remote system may include a more powerful computer that has a database of images that include images of dogs, and the remote system may confirm or identify the classification of the detected object as a dog. Thus, for example, the remote system may send instructions to the vehicle to slow down or change lanes to avoid colliding with the dog.

At block 314, the method 300 includes receiving operation instructions for the vehicle from the remote system responsive to providing the compressed images. In one example, the remote system may include a human operator that analyzes the compressed images to provide the operation instructions. In another example, the remote system may include a more powerful computer system that can analyze the compressed images and provide the operation instructions.

Figure 4A:
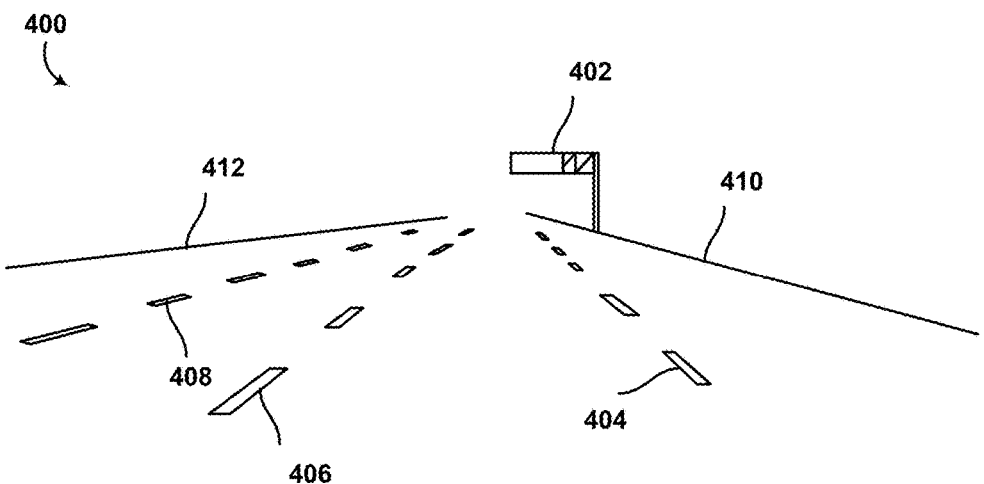
FIG. 4A illustrates a map of an environment, according to an example embodiment.

FIG. 4A illustrates a map 400 of an environment, according to an example embodiment. The map 400 may indicate various features in the environment of a vehicle, such as the vehicle described in the method 300. For example, a view of the environment in FIG. 4A may correspond to a "forward" view of the vehicle. In some examples, other views of the map 400 are possible, such as a "side" view, a "rear" view, or a view from any other angle. Thus, for example, the map 400 may indicate various views of the environment of the vehicle. For example, the map 400 may be implemented as a 3D representation of the environment from a particular viewing angle. Additionally, in some examples, the map 400 may indicate a view of the environment at a particular location. For example, the view illustrated in FIG. 4A may be from a location along a road that corresponds to particular coordinates. Thus, an example system that includes a detailed map of the road (e.g., roadgraph) may receive the particular coordinates and render the map 400 for use by the vehicle. In one example, the example system may include a road map with associated street views (e.g., bird-eye views, satellite images, etc.) along the road map that can be utilized by the system to render the map 400. Additionally or alternatively, in some examples, the map 400 may include additional data such as intensity and/or elevation maps that indicate the various features in the road. For example, the map 400 may be implemented as a symbolic representation of the data pertaining to the various features that is accessible by the vehicle to identify locations and dimensions of the various features.

The map 400 includes various features such as a road sign 402, lane lines 404-408, right perimeter 410, and left perimeter 412. In some examples, other features may be included in the map 400 such as street lights or street intersections. Additionally or alternatively, in some examples, other features next to the right perimeter 410 or the left perimeter 412 may be included in the map 400, such as bus stop signs, buildings, trees, or other features that may help identify the environment.

Additionally, the map 400 may include other information such as dimension information of the view indicated by the map 400. For example, the map 400 may include data that indicates a distance between the right perimeter 410 and the left perimeter 412, or a distance between the lane line 404 and the lane line 406. Further, for example, the data may indicate the dimensions of the road sign 402 and the relative distances between the various features in the map 400.

Although not illustrated in FIG. 4A, in some examples, additional information may be included in the map 400. For example, lighting conditions of the road may be indicated in the map 400. In one example, the road sign 402 may have a shadow that indicates the direction of light from the sun. Thus, for example, a time of day may be determined from the information in the map 400. Referring back to the method 300, for example, various views from the map 400 may be matched with the one or more images from a camera coupled to a vehicle to determine the time of day, and thereby select the threshold distance.

Figure 4B:
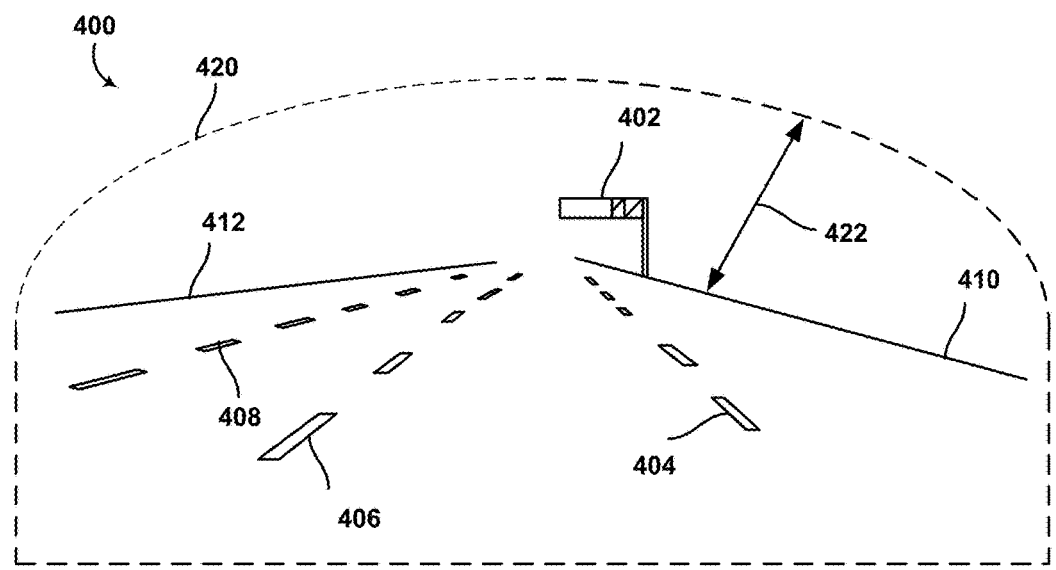
FIG. 4B illustrates a portion of the map of FIG. 4A.

FIG. 4B illustrates a portion 420 of the map 400 of FIG. 4A. The portion 420 may be within a threshold distance 422 to one or more features of the map 400. For example, as illustrated in FIG. 4B, the portion 420 may be within the threshold distance 422 from the right perimeter 410 and/or the left perimeter 412. In some examples, multiple threshold distances may define the portion 420. For example, a first threshold distance (e.g., 1 meter) can be selected from the right perimeter 410 and the left perimeter 412. Further, in this example, a second threshold distance (e.g., 2 meters) can be selected from the line lanes 404-408 or from the road sign 402. Other threshold distance combinations are possible.

In some examples, the threshold distance 422 can be selected by a remote vehicle assistance operator, as described in the method 300. For example, a human operator or a passenger in the vehicle of the method 300 may select one or more threshold distances that define the portion 420. In an example scenario of the method 300, the remote system may view part of a video stream from the vehicle that includes compressed images, and then send instructions to the vehicle to adjust the threshold distance 422 to include more details or otherwise adjust the portion 420. Thus, for example, after matching features between images and the map 400 as described in the method 300, the threshold distance 422 can be selected to define the portion 420 of the map 400 that corresponds to the given area of the images that have a higher amount of details than other areas when compressing the images.

Figure 5A:
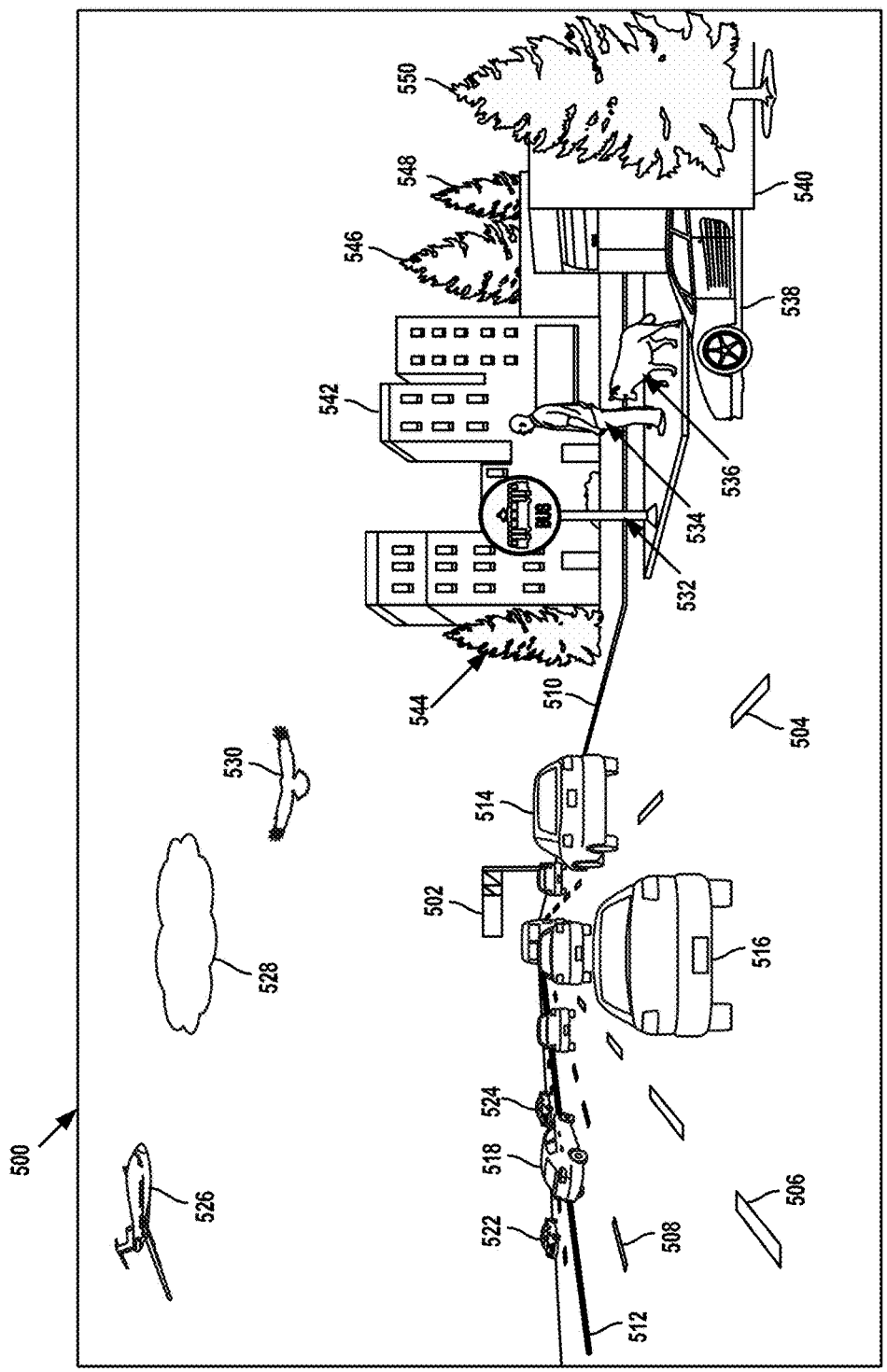
FIG. 5A illustrates an image captured by a camera coupled to a vehicle, according to an example embodiment.

FIG. 5A illustrates an image 500 captured by a camera coupled to a vehicle, according to an example embodiment. The image 500 may be one of the one or more images received by the vehicle of the method 300. For example, the camera may be mounted on top of the vehicle and configured to capture the image 500 of the "forward" view of an environment of the vehicle. Other views are also possible. Thus, the image 500 may include various features in the environment of the vehicle, such as road sign 502, street lanes 504-508, pavement 510, and road separator 512. The image 500 may also include other features along the road, such as cars 514-518. Further, the image 500 may include features such as cars 522-524 that are traveling along an opposite direction to the direction of the vehicle that captured the image 500. Additionally, the image 500 may include features in the environment above the vehicle, such as airplane 526, cloud 528, and bird 530. The image 500 may also include features on the side of the road, such as bus stop 532, pedestrian 534, dog 536, car 538, driveway 540, buildings 542, and trees 544-550.

When compressing an unaltered version of the image 500 for transmission to a remote system as described in the method 300, the resulting compressed image may have a large file size due to the many features included in the image 500. Transmitting the large compressed image via a wired or wireless data connection to the remote system may be prohibited by bandwidth limitations or other data connection limitations.

Further, the remote system may only need a portion of the image 500 that is relevant to the driving situation of the vehicle to assist the vehicle in making driving decisions. For example, features along the road such as cars 514-518 and/or cars 522/524 may be useful in analyzing the driving situation and providing operation instructions for the vehicle. For example, the remote system and/or a human operator may analyze the image 500 and instruct the vehicle not to change lanes into a lane occupied by the cars 522-524 travelling in the opposite direction of the road. Additionally, in some examples, features in the immediate vicinity, such as pedestrian 534, dog 536, and/or the car 538 may also be useful for the remote system. For example, the remote system may instruct the vehicle to change lanes away from the right lane nearest to the pedestrian 534 or the dog 534 to avoid collision. In another example, the vehicle may be unable to classify the car 538 due to the unusual orientation of the car 538 pulling out of the driveway 540. In this example, the remote system may analyze the image 500 and detect that the car 538 is pulling out of the driveway 540, and then instruct the vehicle to switch to another lane.

However, in some examples, some of the features in the image 500 such as airplane 526, cloud 528, bird 530, buildings 542, and/or trees 544-550 may include a large amount of details that are unnecessary for the remote system to assist the vehicle. In one example, the buildings 542 may include a large amount of details in the image such as window features. In another example, the trees 544-546 may be continuously moving due to environmental factors, and thus a video stream of images that include the image 500 may have a large size when compressed by a video compression function. In yet another example, the airplane 526, the cloud 528, and/or the bird 530 may be irrelevant to the driving situation of the vehicle, and thus providing detailed features of the airplane 526, the cloud 528, and/or the bird 530 may unnecessarily increase the size of the compressed image.

Thus, in some examples, a system in the present disclosure may reduce the amount of details in the irrelevant areas of the image 500 before transmitting the image 500 to the remote system for further processing. However, for example, the image 500 may not include depth information or dimension information of the features in the image 500. Thus, the relevant area that includes the road and the immediate vicinity may be difficult to identify based on the image 500 alone. For example, a pixel in the image 500 near the road sign 502 may correspond to a smaller area in the environment than a pixel in the image 500 near the car 516.

To facilitate identifying the area of the image 500 that is relevant to the driving situation of the vehicle, in some examples, the vehicle may match at least one feature in the image 500 with corresponding one or more features in a detailed map of the environment (e.g., roadgraph, 3D representation, etc.). For example, the map 400 of FIGS. 4A-4B may be utilized by the vehicle to match various features such as the road sign 502, the street lanes 504-508, the pavement 510, and/or the road separator 512, respectively, with the road sign 402, the street lanes 404-408, the right perimeter 410, and/or the left perimeter 412 of the map 400. In turn, for example, a given area of the image 500 can be selected to correspond to the portion 420 of the map 400 that includes features on the road and the immediate vicinity of the road as defined by the threshold distance 422 of the map 400. Further, in this example, the image 500 may then be compressed to include a lower amount of details in the areas of the image 500 other than the given area. In turn, for example, the compressed images may have a smaller size to comply with bandwidth limitations when transmitting the compressed images to the remote system for further processing. Various embodiments for reducing the amount of details in areas other than the given area are illustrated in FIGS. 5B-5C.

Figure 5B:
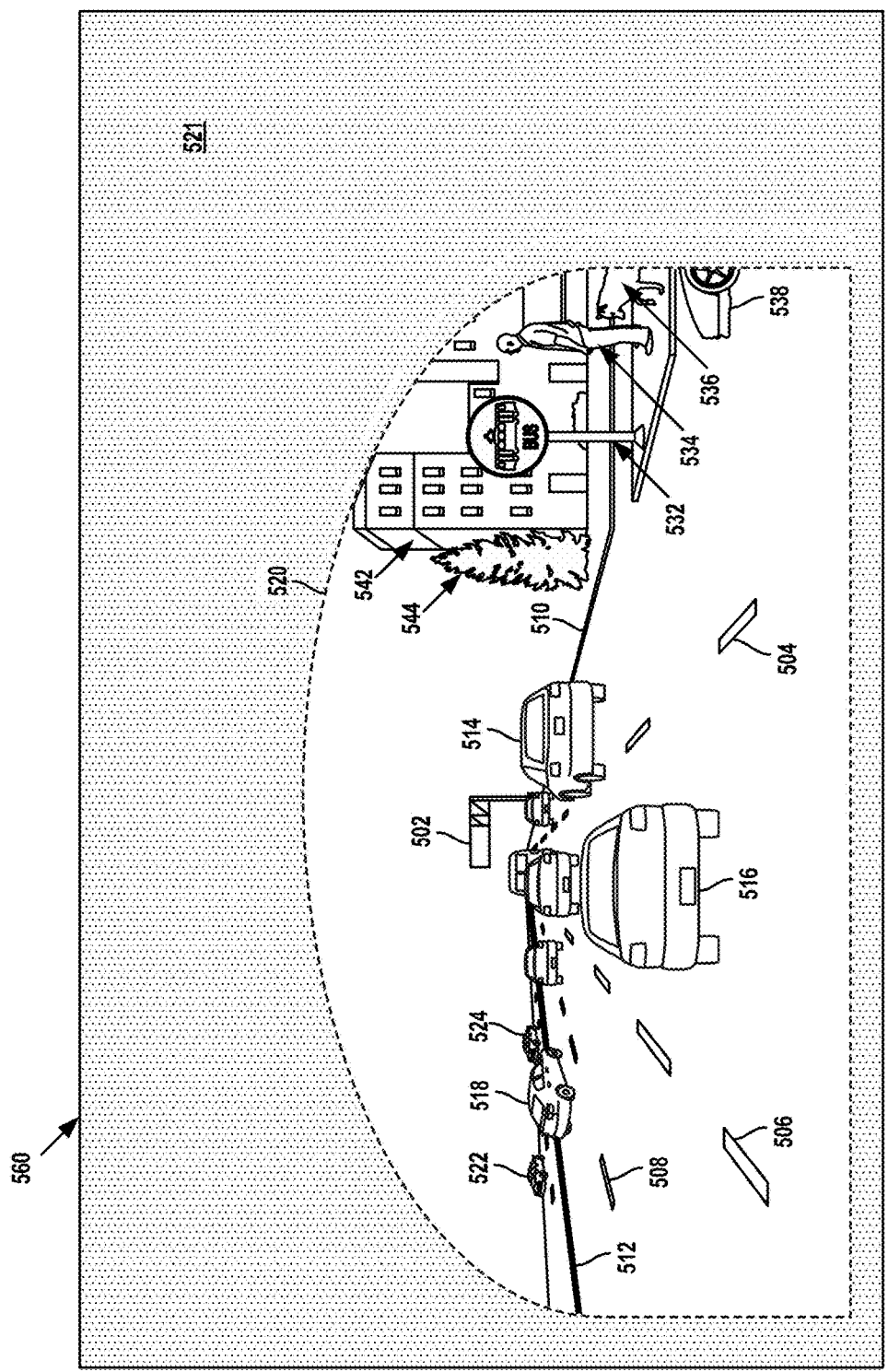
FIG. 5B illustrates a compressed image, according to an example embodiment.
Figure 5C:
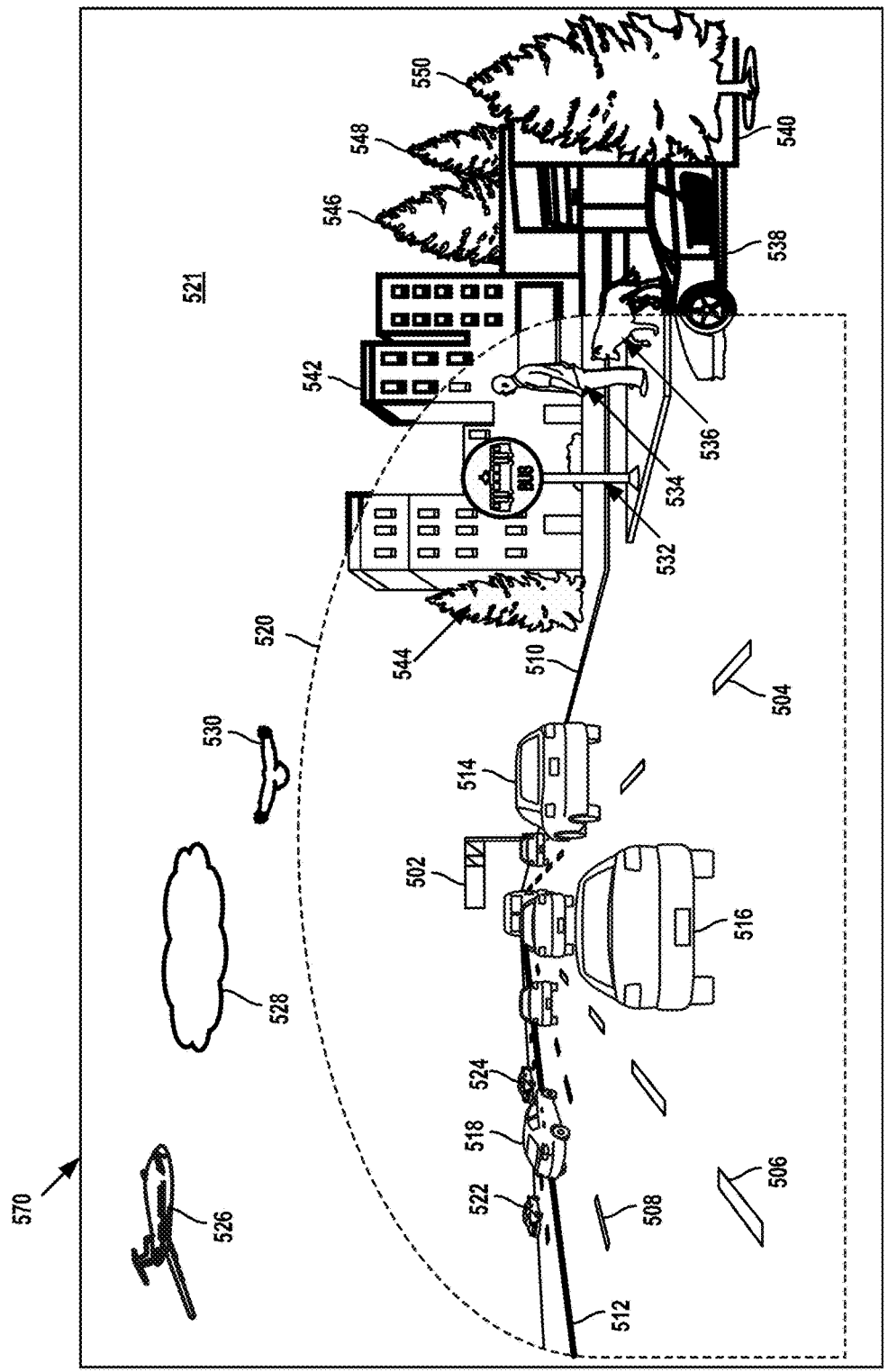
FIG. 5C illustrates another compressed image, according to an example embodiment.

FIG. 5B illustrates a compressed image 560, according to an example embodiment. The compressed image 560 may be generated by the vehicle of the method 300, for example, to include a lower amount of details in areas 521 other than a given area 520. It is noted that the shape of the given area 520 as illustrated in FIG. 5B may be different in various embodiments. Thus, for example, the shape of the given area 520 may be based on the threshold distance selected to describe an area of interest in the image 500 of FIG. 5A that may include the road that the vehicle is travelling on and the immediate vicinity of the road.

As illustrated in FIG. 5B, details of features in the image 500 that correspond to the given area 520 are preserved in the compressed image 560. Further, as illustrated in FIG. 5B, other areas 521 may be replaced with a given color prior to compressing the image 500 into the compressed image 560. In this example, replacing the other areas 521 with a uniform color may allow compression at a higher compression rate than compressing an unaltered version of the image 500.

Further, for example, features relevant to the driving situation of the vehicle, such as cars 514-518, cars 522-524, pedestrian 534, dog 536, and/or car 538 are still viewable in the compressed image 560. Additionally, for example, other irrelevant features of the image 500 such as airplane 526, cloud 528, bird 530, and trees 546-550 are omitted from the compressed image 560 to allow for a higher compression rate. While some of the irrelevant features of the image 500 such as part of the building 542 and the tree 544 are still present in the compressed image 560, for example, these features are within the immediate vicinity of the road and are still significantly reduced to allow for a higher compression rate.

FIG. 5C illustrates another compressed image 570, according to an example embodiment. FIG. 5C illustrates another embodiment for reducing the amount of features in the areas 521 other than the given area 520. As illustrated in FIG. 5C, for example, features such as windows of the airplane 526, windows in some of the buildings 542, feathers of the bird 530, leaves of the trees 546-550, and/or features in the side door of the car 538 are less clear in the compressed image 570 than in the original image 500. However, in some examples, these blurred features may not be necessary for the remote system of the method 300 to analyze the driving situation of the vehicle.

Further, compressing the image 500 with such blurred features will allow for a higher compression rate than compressing an unaltered version of the image 500. Thus, for example, the compressed image 570 may have a smaller size for transmission to the remote system than a size of a compressed image of the unaltered image 500.

In some examples, blurring the features in the areas 521 may be performed by an imaging technique such as Gaussian smoothing. In other examples, blurring the features may be performed after compression of the image 500. For example, an intermediate compressed image of the unaltered image 500 may be generated by the vehicle. In this example, the intermediate image may then be decoded (e.g., Huffman decoding) and the areas of the intermediate image that correspond to the areas 521 can be degraded by removing high-frequency DCT coefficients from the decoded image. The resulting final image in this example may have a smaller size than the intermediate compressed image.

Figure 6:
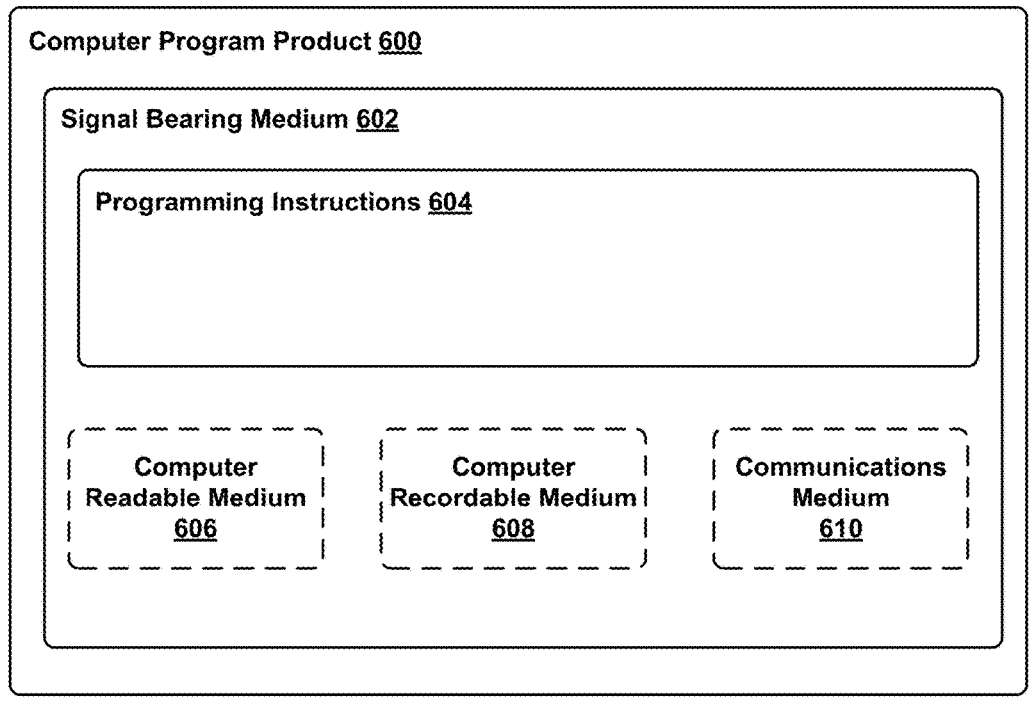
FIG. 6 depicts an example computer readable medium configured according to an example embodiment.

FIG. 6 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. method 300) may be implemented by computer program instructions encoded on a computer readable storage media in a machine-readable format, or on other media or articles of manufacture (e.g., the instructions 115 of the system 100). FIG. 6 is a schematic illustrating a conceptual partial view of an example computer program product that includes a computer program for executing a computer process on a computing device, arranged according to at least some embodiments disclosed herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-5. In some examples, the signal bearing medium 602 may be a computer-readable medium 606, such as, but not limited to, a hard disk drive, a Compact Disc (CD), a Digital Video Disk (DVD), a digital tape, memory, etc. In some implementations, the signal bearing medium 602 may be a computer recordable medium 608, such as, but not limited to, memory, read/write (R/W) CDs, R/W DVDs, etc. In some implementations, the signal bearing medium 602 may be a communication medium 610 (e.g., a fiber optic cable, a waveguide, a wired communications link, etc.). Thus, for example, the signal bearing medium 602 may be conveyed by a wireless form of the communications medium 610.

The one or more programming instructions 604 may be, for example, computer executable and/or logic implemented instructions. In some examples, a computing device may be configured to provide various operations, functions, or actions in response to the programming instructions 604 conveyed to the computing device by one or more of the computer readable medium 606, the computer recordable medium 608, and/or the communications medium 610.

The computer readable medium 606 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   a vehicle accessing a stored representation of an environment of the vehicle;
   receiving, from a sensor of the vehicle, sensor data indicative of the environment;
   matching a feature of the environment indicated in the sensor data to a corresponding feature indicated in the stored representation;
   identifying a first portion of the sensor data, the first portion being associated with a region of the environment that is within a threshold distance to the matched feature;
   compressing the sensor data to reduce a second portion of the sensor data; and
   providing the compressed sensor data for receipt by a remote system.

2. The method of claim 1, wherein the second portion of the sensor data is associated with a region of the environment that is at a distance greater than the threshold distance to the matched feature.

3. The method of claim 1, further comprising:
   receiving, from the remote system, operation instructions for the vehicle, wherein the operation instructions are based on the compressed sensor data.

4. The method of claim 1, wherein the sensor is a camera, and wherein the sensor data comprises one or more images.

5. The method of claim 1, wherein the sensor is a radar unit, and wherein the sensor data comprises an indication of one or more objects in the environment of the vehicle.

6. The method of claim 1, wherein the sensor is a microphone, and wherein the sensor data comprises an indication of sounds in the environment of the vehicle.

7. The method of claim 1, further comprising:
   obtaining, via a second sensor of the vehicle, an image of the environment, wherein the image is associated with the sensor data, and wherein matching the feature indicated in the sensor data with the corresponding feature indicated in the stored representation is based on a comparison between the image and the stored representation.

8. The method of claim 7, further comprising:
   compressing the image to reduce an amount of details in a portion of the image that corresponds to the region of the environment that is at least at the threshold distance to the matched feature; and
   transmitting the compressed image for receipt by the remote system.

9. The method of claim 1, further comprising:
   receiving, from the remote system, a selection of the sensor associated with the sensor data, wherein receiving the sensor data from the sensor is based on the received selection.

10. The method of claim 1, further comprising:
    receiving, from the remote system, an indication of the threshold distance to the matched feature, wherein identifying the first portion of the sensor data is based on the received indication.

11. The method of claim 1, further comprising:
    determining the threshold distance to the matched feature based on lighting conditions associated with the received sensor data, wherein identifying the first portion of the sensor data is based on the determined threshold distance.

12. The method of claim 1, further comprising:
    determining the threshold distance to the matched feature based on information included in the stored representation, wherein identifying the first portion of the sensor data is based on the determined threshold distance.

13. A vehicle comprising:
    a sensor to provide sensor data indicative of an environment of the vehicle;
    one or more processors; and
    data storage storing instructions executable by the one or more processors to cause the vehicle to:
    access a stored representation of an environment of the vehicle;
    obtain the sensor data from the sensor;

match a feature of the environment indicated in the sensor data to a corresponding feature indicated in the stored representation;

identify a first portion of the sensor data, the first portion being associated with a region of the environment that is within a threshold distance to the matched feature;

compress the sensor data to reduce a second portion of the sensor data; and provide the compressed sensor data for receipt by a remote system.

14. The vehicle of claim 13, further comprising a second sensor to provide an image of the environment, wherein the image is associated with the sensor data, and wherein the instructions executable by the one or more processors further cause the vehicle to:

obtain, via the second sensor, the image of the environment, wherein matching the feature indicated in the sensor data with the corresponding feature indicated in the stored representation is based on a comparison between the image and the stored representation.

15. The vehicle of claim 14, wherein the instructions executable by the one or more processors further cause the vehicle to:

compress the image to reduce an amount of details in a portion of the image that corresponds to the region of the environment that is at least at the threshold distance to the matched feature; and transmit the compressed image for receipt by the remote system.

16. The vehicle of claim 14, wherein the instructions executable by the one or more processors further cause the vehicle to:

determine the threshold distance to the matched feature based on lighting conditions associated with the image, wherein identifying the first portion of the sensor data is based on the determined threshold distance.

17. A non-transitory computer readable medium having stored therein instructions, that when executed by a device, cause the device to perform functions comprising:

accessing a stored representation of an environment of a vehicle;

receiving sensor data indicative of the environment of the vehicle;

matching a feature of the environment indicated in the sensor data to a corresponding feature indicated in the stored representation;

identifying a first portion of the sensor data, the first portion being associated with a region of the environment that is within a threshold distance to the matched feature;

compressing the sensor data to reduce a second portion of the sensor data; and causing the vehicle to wirelessly transmit the compressed sensor data.

18. The non-transitory computer readable medium of claim 17, wherein the sensor data is associated with a camera, and wherein the sensor data comprises one or more images.

19. The non-transitory computer readable medium of claim 17, wherein the sensor data is associated with a radar unit, and wherein the sensor data comprises an indication of one or more objects in the environment of the vehicle.

20. The non-transitory computer readable medium of claim 17, wherein the sensor data is associated with a microphone, and wherein the sensor data comprises an indication of sounds in the environment of the vehicle.

* * * * *